US010803728B1

United States Patent
Allen et al.

(10) Patent No.: US 10,803,728 B1
(45) Date of Patent: Oct. 13, 2020

(54) DYNAMICALLY NETWORKED INTEGRATED SWARM SENSOR TRACKING

(71) Applicant: INTERNATIONAL BUSINESS MACHINES CORPORATION, Armonk, NY (US)

(72) Inventors: Corville O. Allen, Morrisville, NC (US); Shikhar Kwatra, Durham, NC (US); Andrew R. Freed, Cary, NC (US); Joseph Kozhaya, Morrisville, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/384,364

(22) Filed: Apr. 15, 2019

(51) Int. Cl.
*G08B 21/02* (2006.01)
*G08B 21/22* (2006.01)
(Continued)

(52) U.S. Cl.
CPC ............ *G08B 21/22* (2013.01); *G01S 5/0284* (2013.01); *G08B 21/182* (2013.01); *H04W 4/029* (2018.02)

(58) Field of Classification Search
CPC .... G06Q 30/02; G06Q 30/0261; G06Q 50/01; G06Q 30/0225; G06Q 30/0605; G06Q 20/02; G06Q 20/04; G06Q 20/20; G06Q 20/29; G06Q 20/32; G06Q 20/322; G06Q 20/327; G06Q 20/341; G06Q 20/3572; G06Q 20/363; G06Q 20/388; G06Q 20/4014; G06Q 20/4037; G06Q 30/0212; G06Q 30/0226; G06Q 30/0267; G06Q 30/0269; G06Q 10/10; G06Q 30/0201; G06Q 30/0242; G06Q 30/0246; H04W 4/029; H04W 4/02; H04W 4/021; H04W 24/00; H04W 4/14; H04W 4/08; H04W 4/90; H04W 76/50; H04W 84/18;
(Continued)

(56) References Cited

U.S. PATENT DOCUMENTS

| | | | |
|---|---|---|---|
| 6,975,873 B1 * | 12/2005 | Banks | H04W 64/00 455/456.1 |
| 7,817,038 B2 | 10/2010 | Torning | |

(Continued)

OTHER PUBLICATIONS

Kumar et al., "Cluster-based Position Tracking of Mobile Sensors", School of Information Tech. & Elec. Engineering University of Queensland Australia, Accessed Apr. 11, 2019, 8 pages, <https://arxiv.org/ftp/arxiv/papers/1710/1710.04589.pdf>.

(Continued)

*Primary Examiner* — Daniel Previl
(74) *Attorney, Agent, or Firm* — Jay Wahlquist; Andrew D. Wright; Roberts Calderon Safran & Cole, P.C.

(57) ABSTRACT

A computer-implemented method includes initiating a plurality of devices, each device corresponding to a member of a group, the group including a plurality of members; monitoring proximity information for each of the plurality of devices relative to at least one other one of the plurality of devices; establishing a maximum distance for the devices to be spaced from each other; and in response to one of the devices being separated from another of the devices by more than the maximum distance, sending an alert to at least one of remaining devices.

20 Claims, 6 Drawing Sheets

(51) Int. Cl.
*H04W 4/029* (2018.01)
*G01S 5/02* (2010.01)
*G08B 21/18* (2006.01)

(58) Field of Classification Search
CPC ......... H04W 8/18; H04W 8/20; H04W 64/00; H04W 4/023; H04W 4/80; H04M 2242/04; H04M 2242/30; H04M 2250/12; H04M 3/5116; G07F 7/08; G07F 7/0866; G07F 7/088; G07F 7/0886; G07F 7/0893; G07F 7/1008; G08B 21/0227; G08B 21/0236; G08B 21/0263; G08B 21/0266; G08B 21/0294; G06F 16/29; H04H 60/31; H04L 65/1069; H04L 65/403
USPC ............ 340/573.4, 573.3, 582, 686.1, 691.6, 340/686.6, 693.8, 3.1, 3.9, 825.22, 340/825.36, 825.49
See application file for complete search history.

(56) References Cited

U.S. PATENT DOCUMENTS

| | | | |
|---|---|---|---|
| 8,755,824 B1 | 6/2014 | Wang et al. | |
| 10,419,915 B2* | 9/2019 | Mehta | H04W 76/50 |
| 2004/0029569 A1* | 2/2004 | Khan | G06Q 20/02 455/414.1 |
| 2007/0008120 A1 | 1/2007 | Smith et al. | |
| 2008/0291004 A1 | 11/2008 | Regan et al. | |
| 2011/0063138 A1 | 3/2011 | Berkobin et al. | |
| 2014/0210616 A1* | 7/2014 | Ramachandran | G08B 21/0227 340/539.13 |
| 2014/0241354 A1 | 8/2014 | Shuman et al. | |
| 2014/0378167 A1 | 12/2014 | Haney | |
| 2015/0080011 A1* | 3/2015 | Zelinka | H04W 4/38 455/456.1 |
| 2017/0005826 A1 | 1/2017 | Youn | |
| 2017/0118592 A1 | 4/2017 | Patel et al. | |
| 2017/0251347 A1* | 8/2017 | Mehta | H04W 4/02 |
| 2018/0249295 A1* | 8/2018 | Moraru | H04W 84/18 |

OTHER PUBLICATIONS

Mell et al., "The NIST Definition of Cloud Computing", NIST, Special Publication 800-145, Sep. 2011, 7 pages.
Tri Do et al., "Contextual Grouping: Discovering Real-Life Interaction Types from Longitudinal Bluetooth Data", IEEE 12th International Conference on Mobile Data Management, 2011, Abstract, 7 pages.
Unknown,"Bluedating", Wikipedia, Accessed Apr. 11, 2019 <https://en.wikipedia.org/wiki/Bluedating>, 1 page.
Unknown, "Piconet", Wikipedia, Accessed Apr. 11, 2019 <https://en.wikipedia.org/wiki/Piconet>, 2 pages.
Unknown, "Scatternet", Wikipedia, Accessed Apr. 11, 2019 <https://en.wikipedia.org/wiki/Scatternet>, 2 pages.
Akat et al., "Particle swarm optimization with dynamic neighborhood topology: Three neighborhood strategies and preliminary results", 2008 IEEE Swarm Intelligence Symposium, Sep. 21-23, 2008, Abstract, 2 pages.

* cited by examiner

US 10,803,728 B1

DYNAMICALLY NETWORKED INTEGRATED SWARM SENSOR TRACKING

BACKGROUND

The present invention relates generally to a proximity-based tracking application of members of a group, and, more particularly, to dynamically tracking the members of the group while the group is in motion.

When a group of members, organized to achieve a same purpose, is in motion, it is typically advantageous to determine whether the members of the group remain within a defined physical distance from each other while the group is in motion so as to continue to be able to achieve the same purpose.

SUMMARY

In a first aspect of the invention, there is a computer-implemented method including initiating, by a computer device, a plurality of devices, each device corresponding to a member of a group, the group including a plurality of members; monitoring, by the computer device, a proximity information for each of the plurality of devices relative to at least one other one of the plurality of devices; establishing, by the computer device, a maximum distance for the devices to be spaced from each other; and in response to one of the devices being separated from another of the devices by more than the maximum distance, sending an alert to at least one of remaining devices.

In another aspect of the invention, there is a computer program product including a computer readable storage medium having program instructions embodied therewith. The program instructions are executable by a computing device to cause the computing device to establish identification information for each of a plurality of devices, each device corresponding to a member of a group, the group including a plurality of members; establish a common context for the plurality of members of the group; monitor a proximity information for each of the plurality of devices relative to at least one other one of the plurality of devices; establish a maximum distance for the devices to be spaced from each other; and in response to one of the devices being separated from another of the devices by more than the maximum distance, send an alert to at least one of remaining devices.

In another aspect of the invention, there is system including a processor, a computer readable memory, and a computer readable storage medium. The system includes program instructions to establish identification information for each of a plurality of devices, each device corresponding to a member of a group, the group including a plurality of members; program instructions to establish a common context for the plurality of members of the group, the common context including at least one selected from the group consisting of a purpose, an identity of each member of the plurality of members, an identification of a primary device from the plurality of devices, a network address of each device, a purpose of the group, a purpose of each member of the group, a destination of the group, an age of each member, an interest of each member, a cost of each member, and a lifetime of each member; program instructions to monitor a proximity information for each of the plurality of devices relative to at least one other one of the plurality of devices; program instructions to establish a maximum distance for the devices to be spaced from each other; and program instructions to, in response to one of the devices being separated from another of the devices by more than the maximum distance, send an alert to at least one of remaining devices. The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
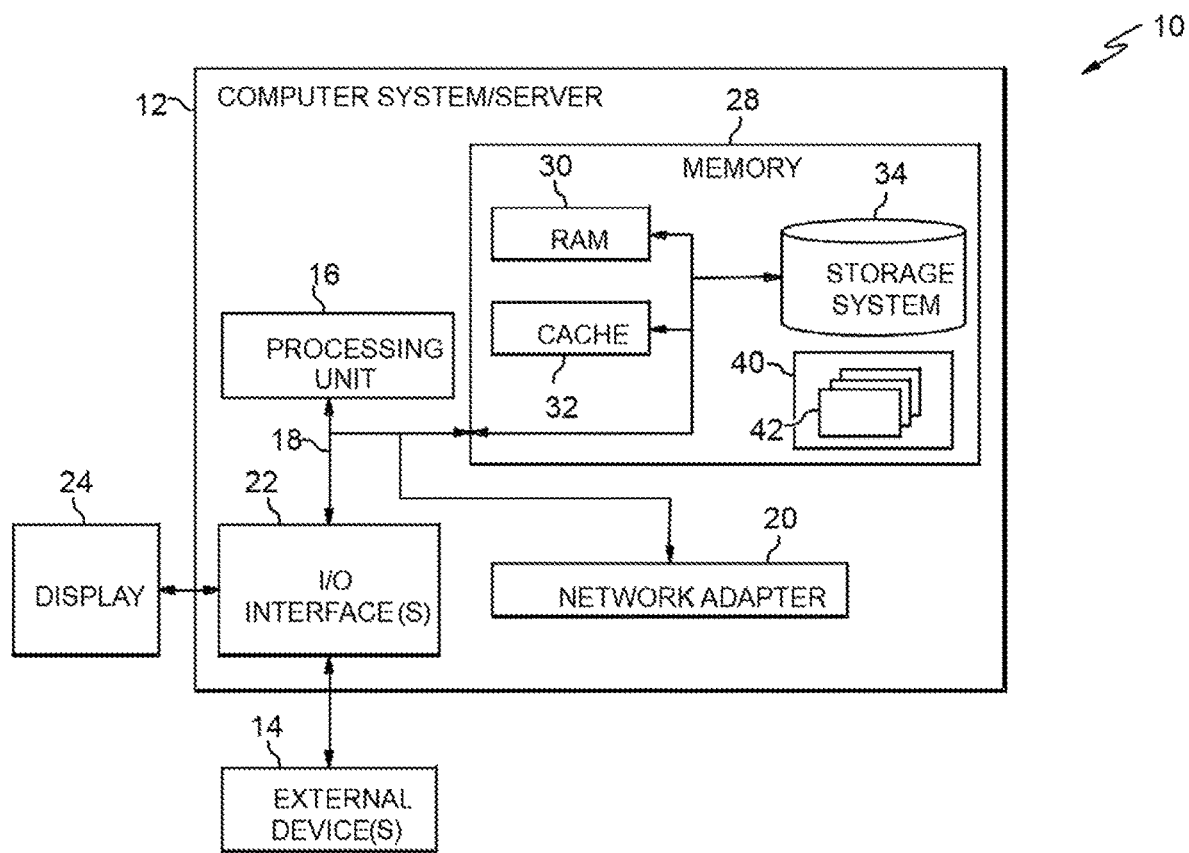
FIG. 1 depicts a cloud computing node according to an embodiment of the present invention.

The present invention relates generally to a proximity-based tracking application of members of a group, and, more particularly, to dynamically tracking the members of the group while the group is in motion.

Embodiments of the invention improve the technology of swarm tracking by sending an alert to at least one remaining device of a plurality of devices in response to one of the devices being separated from another of the devices by more than a maximum distance. Embodiments of the invention employ an unconventional arrangement of steps including: initiating a plurality of devices, each device corresponding to a member of a group, the group including a plurality of members; monitoring proximity information for each of the plurality of devices relative to at least one other one of the plurality of devices; establishing a maximum distance for the devices to be spaced from each other; and in response to one of the devices being separated from another of the devices by more than the maximum distance, sending an alert to at least one of remaining devices. The steps themselves are unconventional, and the combination of the steps is also unconventional. For example, the step of monitoring proximity information for each of the plurality of devices relative to at least one other one of the plurality of devices creates new information that does not exist in the system, and this new information is then used in subsequent steps in an unconventional manner, namely to send an alert to at least one of remaining devices in response to one of the devices being separated from another of the devices by more than the maximum distance. Further, the unconventional method limits the requirement for Global Positioning System (GPS) in use, or geographic location being required to keep a plurality of devices or the objects or people attached to the devices together.

In embodiments, a method of tracking members of a group while the group is in motion includes attaching, or alternatively assigning, a device to each member of the group, the devices of all the members of the group being able to communicate with each other and to exchange proximity information with each other. In embodiments, the devices include a primary device and a plurality of secondary devices, the primary device communicating with the secondary devices of the group and gathering proximity information for each of the secondary devices at regular intervals. In embodiments, the relative proximity of the various members of the group can be monitored via their respective devices. In embodiments, when a member of the group strays beyond a defined distance from the group, an alert is sent to the devices of the remaining members of the group, including the primary device and the remaining secondary devices. Alternatively, when a member of the group strays beyond a defined distance from the group, an alert is sent only to the primary device.

In embodiments, the members of the group communicate with each other via their respective devices, such as wearable sensors or built-in sensors in smart phones, tablet computers, and the like. For example, the devices include Bluetooth devices, radio-frequency transmission devices, or low-power short range transmission devices such as Near Field Communication (NFC) devices. In embodiments, the devices are connected to each other without global positioning system (GPS) and without internet connectivity.

In embodiments, the devices exchange proximity information with each other in order to monitor the relative proximities of each member of the group relative to the other members, or relative to the primary device. In embodiments, the proximity of each of the secondary devices within a group is monitored with respect to their relative distance to the primary device. In embodiments, while the members of the group, and their associated devices, are either moving in space or stationary, their respective relative distance to the primary device, or to each other, is monitored. In embodiments, while the members of the group are either moving or stationary, if one of the members of the group having a secondary device strays past a defined distance from the member of the group having the primary device, then an alert is sent to all the remaining members of the group via their respective devices. Alternatively, if one of the members of the group having a secondary device strays past a defined distance from the member of the group having the primary device, then an alert is sent only to the member having the primary device via the primary device.

In separate embodiments, the devices include GPS devices or internet connectivity devices.

In embodiments, the members of the group share a common context, the context including a set of rules identifying the group. In embodiments, the group includes members moving within a defined spatial environment such as, for example, a group of students in an amusement park, a group of workers in a work site, or a group of firefighters within the environs of a forest fire. In the above examples, the context includes the fact that the members of the group are students, workers or firefighters, the number of students/workers/firefighters, the proximity of the amusement part/work site/forest, and the reason for their being at that proximity, namely a visit/work assignment/forest fire. In embodiments, the group includes packages traveling to a destination across a number of intermediate points, the intermediate points including warehouses and/or way stations. In this example, the context includes the fact that the members of the group are packages, the numbers of packages, the estimated time of arrival of the packages, the common destination of the packages, and any intermediate way stations for the packages on the way to the common destination.

In embodiments, a method of tracking a plurality of members of a group, each member having a device, includes initiating each of the devices by identifying each device and its network address. In embodiments, the method also includes identifying metadata associated with each device, the metadata including the context of the group and the set of rules identifying the group, the defined proximities of the group, and the defined number of members of the group. In embodiments, the context of the group includes the defined purpose of the group, and the set of rules defines the conditions for a member to be part of the group. In embodiments, the metadata also includes the identity of the primary member of the group. In embodiments, the metadata also includes a maximum distance within which each member of the group can be from the primary member, or from each other, before setting off an alarm. Accordingly, the members of the group travel as a swarm and monitor each other's respective proximities so as to remain within a defined distance from each other. In embodiments, if one of the members of the group strays past the defined distance from another member, or from the primary member, of the group, then an alert is sent to the remaining members of the group, or alternatively the alert is sent only to the primary member of the group.

In embodiments, a local network consists of the members of the group, the members of the group being identified and the devices of each member being initiated. In embodiments, the devices are clustered in a group within a defined distance of each other, and share a common context. For example, the common context is a common purpose, such as a travel destination or a mission. In embodiments, the common purpose is a reason to be together, such as traveling to a destination. In embodiments, at regular intervals, each of the devices scans for the other devices of each member of the group to obtain a proximity of the other devices, and thus a proximity of the other members of the group. Accordingly, at regular intervals, the devices receive updated proximity information for the proximity of each member of the group, the updated information including, for example, a current proximity of each member of the group. In embodiments, only the primary device, associated with the primary member of the group, receives updated proximity information for the proximity of each secondary member of the group via their respective secondary devices. In embodiments, the primary member is the leader of the group. In embodiments, the identification information of each device, indicative of the proximity of each respective member, is stored in a memory of the primary device, associated with the primary member of the group. In embodiments, the identification information of each device includes an identity of the member to which the device belongs, an identification of the primary device of the group, a network address of the device, a purpose of the group, a purpose of each member within the group, a destination of the group, an age of each member, an interest of each member, a cost of each member, a lifetime of each member, and the like.

In embodiments, the method assigns a score to the various members of the group, the score determining whether the members belong to the same group. For example, if the members are students, the score for each student is based on age, type of project, interests, and the like. If the members are packages to be shipped to a destination, the score for each package is based on the type of item being transported, the cost, and the distance to be travelled by the package. The method utilizes similar metadata or information in the common context of the device to allow flexible transition or identification to a group or groups.

In other embodiments, the scores for each of the members are stored in a monitoring server, and the scores of all the members of a same group are close to one another, and are different from the scores of all the members of a different group. In embodiments, the proximity information of each member of a group is transmitted to a monitoring server from the primary device of the group. In embodiments, a display screen at the monitoring server displays the dynamic relative proximity of each member of the group, the display screen showing the regularly updated relative proximity of the dynamic network created by the group of members over time and distance.

In separate embodiments, the proximity information of each member of the group is transmitted to the monitoring server via GPS or internet connectivity.

In embodiments, a plurality of groups, each group including a plurality of members, are in motion. In embodiments, if a member of a first group strays beyond a defined distance from the remaining members of the same first group, then the member joins a second group, and is no longer a member of the first group, as long as the member shares a common context with the members of the second group. For example, if a runner from a first group of runners (herein referred to as a "drifting runner") strays too far from the remaining members of the first group and becomes close to a second group of runners, then the drifting runner joins the second group of runners and leaves the first group. Accordingly, the primary member of the first group adjusts the membership of the first group to remove the drifting runner from the first group. In embodiments, the primary member of the second group adjusts the membership of the second group to add the drifting runner to the second group, and the drifting runner is added to the second group. In embodiments, if the drifting runner is part of the first group and strays too far from the remaining members of the first group, then an alert is sent to the remaining members of the first group, or alternatively to only the primary member of the first group. In embodiments, if the drifting runner strays too far from the remaining members of the first group, then the alert is also sent to other neighboring groups, such as the second group, as long as the neighboring groups share the common context as the first group. As a result, if the drifting runner comes within a defined distance of another group such as the second group, then the primary member of the second group automatically adds the drifting runner to the membership of the second group, and the primary member of the first group automatically removes the drifting runner from the membership of the first group.

In embodiments, a method of tracking a plurality of objects (members) includes identifying each of the plurality of devices associated with the objects based on a respective identification and a respective network address of each device; clustering the plurality of objects into a plurality of groups, wherein each of the plurality of groups includes a corresponding non-overlapping subset of the plurality of objects, each object of each respective group sharing a common context with all of the other objects of the same group, and each object of each respective group being communicatively connected to the other objects of the same group; designating one of the plurality of objects in each of the plurality of groups as a primary object; monitoring a respective distance of each object in a first group from the other objects in the first group; in response to determining that a first object in the first group exceeds a defined distance from the other objects in the first group, sending an alert which includes information identifying the first object and a next nearest group shares a common context with the first object. In embodiments, each object of each respective group is communicatively connected to the other objects of the same group using low-power short range connectivity.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of proximity independence in that the consumer generally has no control or knowledge over the exact proximity of the provided resources but may be able to specify proximity at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
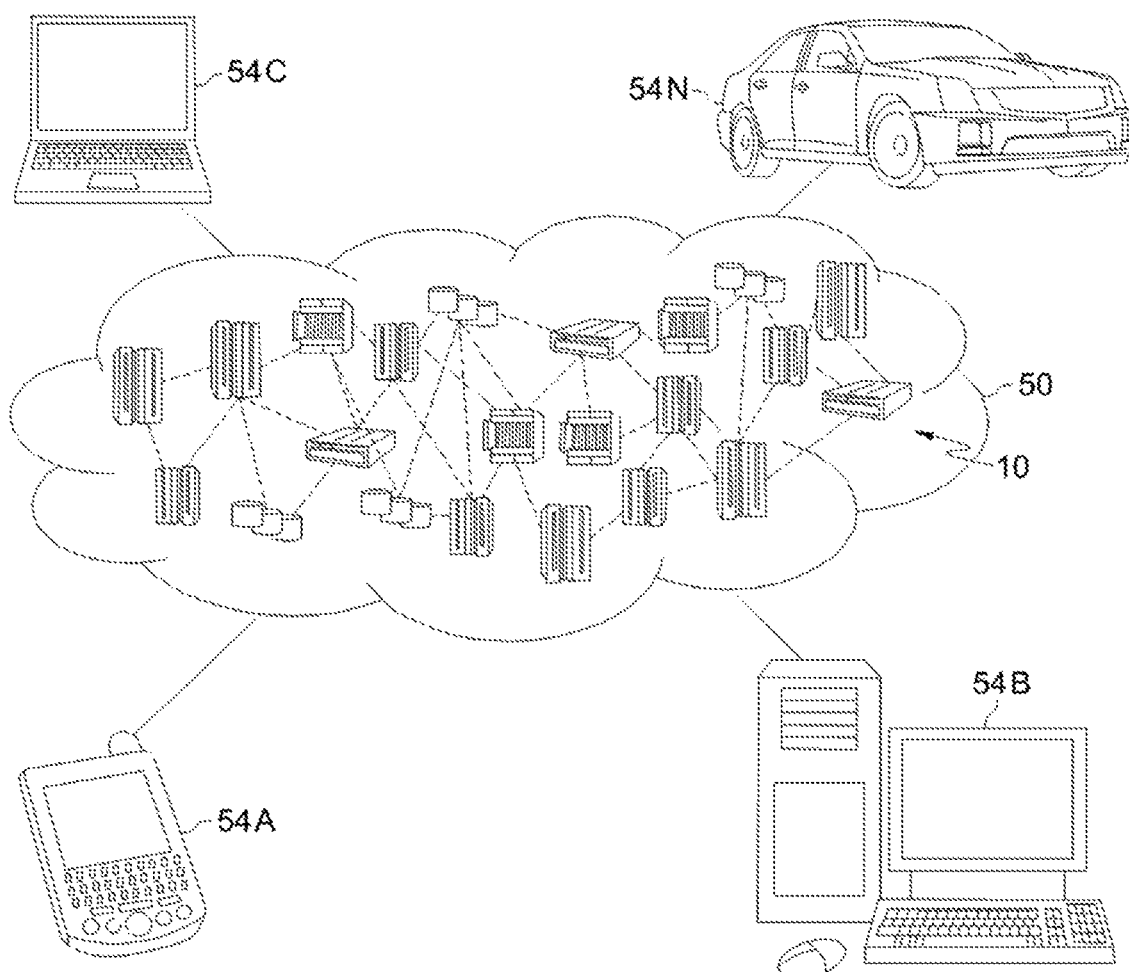
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
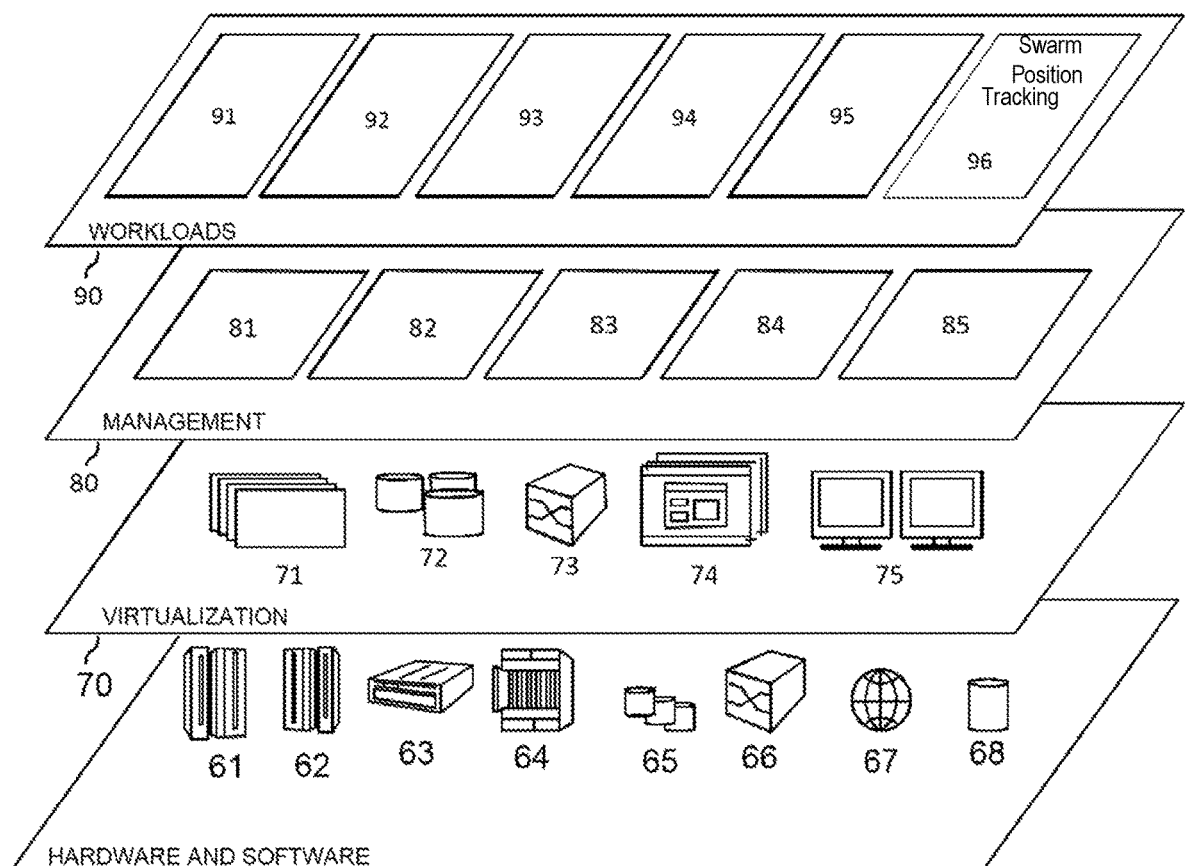
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dynamic swarm position tracking 96.

Implementations of the invention may include a computer system/server 12 of FIG. 1 in which one or more of the program modules 42 are configured to perform (or cause the computer system/server 12 to perform) one of more functions of the dynamic swarm position tracking 96 of FIG. 3. For example, the one or more of the program modules 42 may be configured to: establish identification information for each of a plurality of devices, each device corresponding to a member of a group, the group including a plurality of members; establish a common context for the plurality of members of the group; monitor a proximity information for each of the plurality of devices relative to at least one other one of the plurality of devices; establish a maximum distance for the devices to be spaced from each other; and in response to one of the devices being separated from another of the devices by more than the maximum distance, send an alert to at least one of remaining devices.

Figure 4:
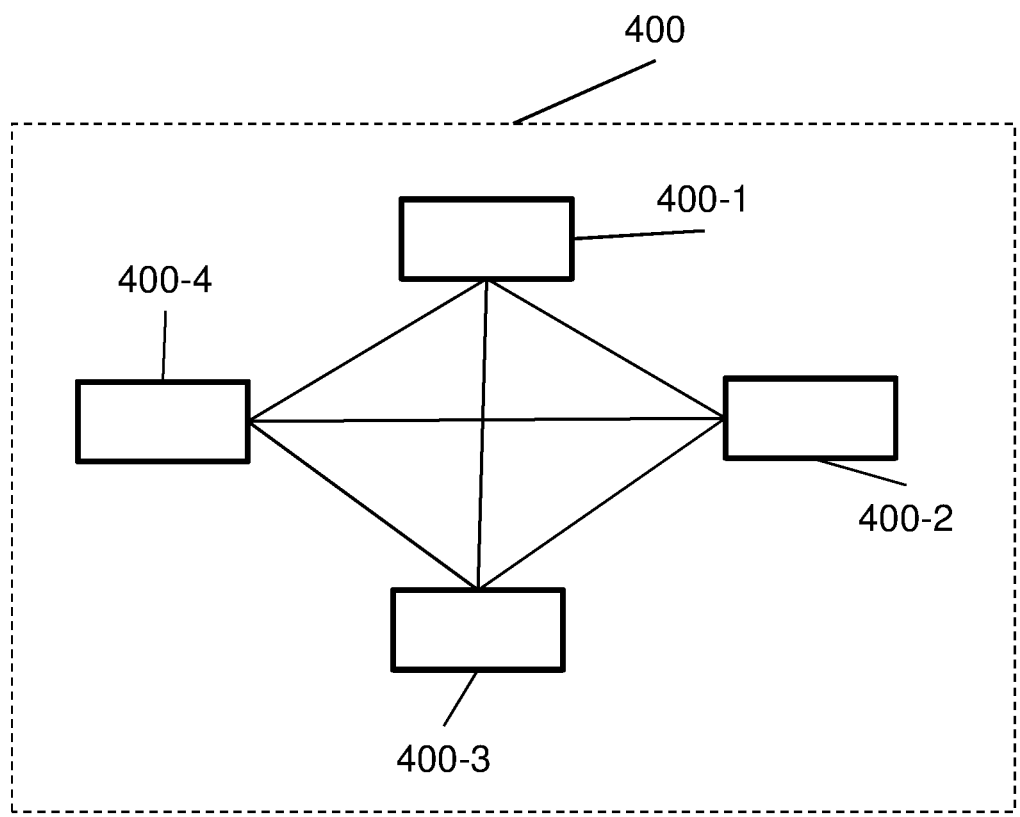
FIG. 4 shows a block diagram of an exemplary environment in accordance with aspects of the invention.

FIG. 4 shows a block diagram of an exemplary environment in accordance with aspects of the invention. In FIG. 4, a group 400 includes a plurality of devices 400-1, 400-2, 400-3 and 400-4, each of the devices 400-1, 400-2, 400-3 and 400-4 being associated with a member of the group 400, and each member of the group 400 sharing a common context. In embodiments, the device 400-1 is a primary device, and devices 400-2, 400-3 and 400-4 are secondary devices. Accordingly, the devices 400-1, 400-2, 400-3 and 400-4 constitute a local scatternet. In embodiments, although FIG. 4 illustrates the group 400 including four (4) devices, the group 400 can include more or less than four (4) devices. In embodiments, each of the plurality of devices 400-1, 400-2, 400-3 and 400-4 includes one or more computer systems/servers such as the computer system/server 12 illustrated in FIG. 1. In embodiments, the group 400 constitutes an ad hoc network. In embodiments, the devices 400-1, 400-2, 400-3 and 400-4 are connected to each other without global positioning system (GPS) and without internet connectivity.

In operation, each of the devices 400-1, 400-2, 400-3 and 400-4 of the group 400 transmits their proximity information to the other devices of the same group 400 at regular intervals. In embodiments, each device of the group 400 transmits their proximity information to the primary device (e.g., device 400-1) of the group 400, and the primary device (e.g., device 400-1) stores the proximity information of each device in a memory thereof. In embodiments, the memory of the primary device (e.g., device 400-1) includes a memory such as the system memory 28 illustrated in FIG. 1. In operation, each of the devices 400-1, 400-2, 400-3 and 400-4 of the group 400 transmits their proximity information via a short-range communication device such as, e.g., a Bluetooth device, a radio-frequency transmission device, or a low-power short range transmission device. In embodiments, a range of operation of the devices 400-1, 400-2, 400-3 and 400-4 of the group 400 is within a defined distance, the defined distance being determined by an administrator or manager and delimiting a boundary of the group 400.

In separate embodiments, each of the devices 400-1, 400-2, 400-3 and 400-4 of the group 400 transmits their proximity information to a monitoring server (not shown) via a cloud computing environment such as the cloud computing environment 50 illustrated in FIG. 2. In embodiments, the cloud computing environment 50 is also connected to the group 400 including the plurality of devices 400-1, 400-2, 400-3 and 400-4. In embodiments, the relative proximities of the devices 400-1, 400-2, 400-3 and 400-4 are transmitted to the monitoring server via the cloud computing environment 50, and are stored in a memory of the monitoring server. In embodiments, the monitoring server includes one or more computer systems/servers such as the computer system/server 12 illustrated in FIG. 1. In embodiments, the primary device of the group 400 transmits the proximity information of each of the devices 400-1, 400-2, 400-3 and 400-4 of the group 400 to the monitoring server via the cloud computing environment 50. In embodiments, the monitoring server includes, or is coupled to, a display screen of a display device and displays the dynamic proximity of the group 400 on the display screen. In embodiments, the monitoring server displays the dynamic proximities of each of the devices 400-1, 400-2, 400-3 and 400-4 of the group 400 on the display screen of the display device.

Figure 5:
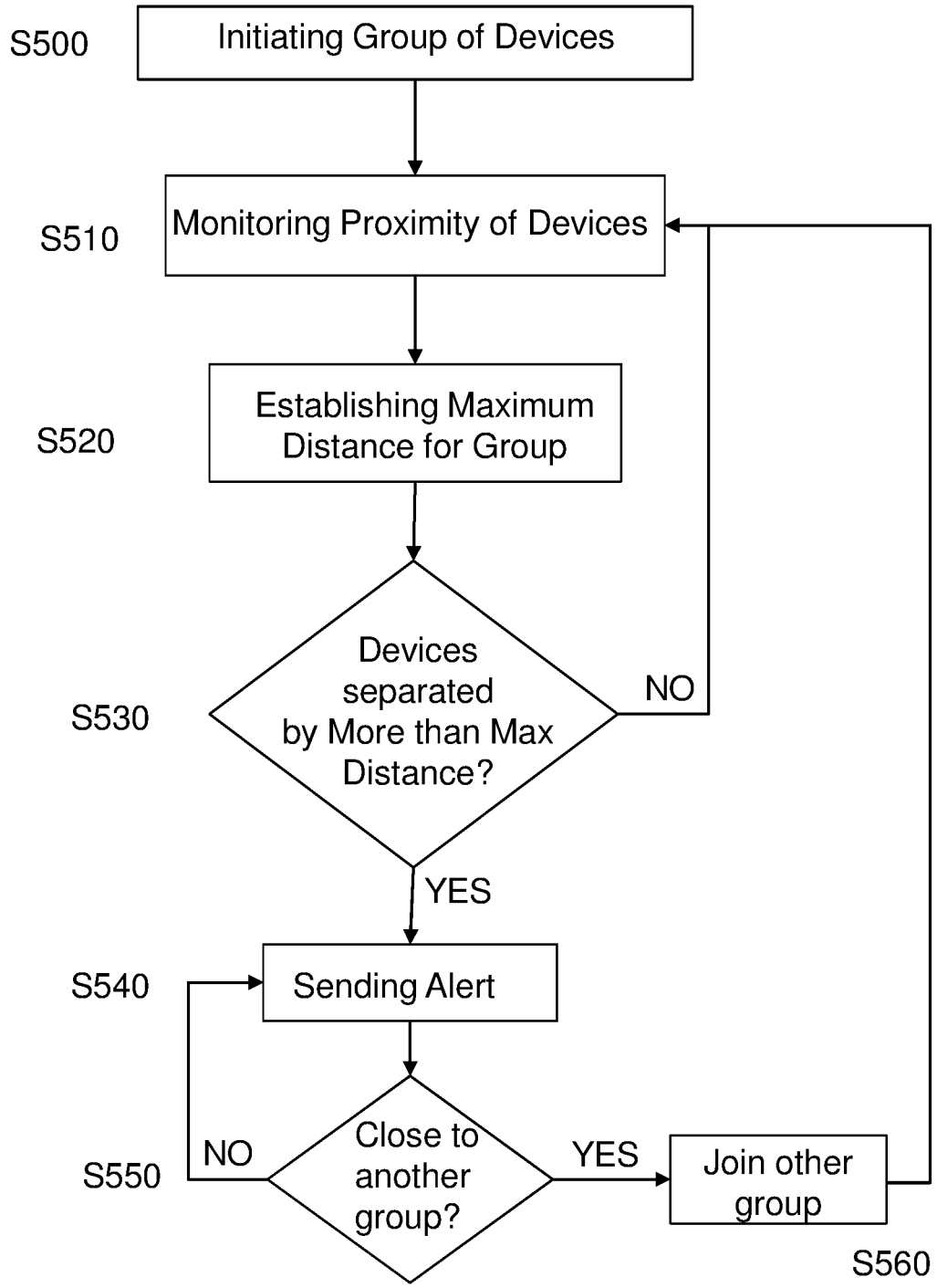
FIG. 5 shows a flowchart of an exemplary method in accordance with aspects of the invention.

FIG. 5 shows a flowchart of an exemplary method in accordance with aspects of the present invention. Steps of the method may be carried out in the environment of FIG. 4 and are described with reference to elements depicted in FIG. 4.

At step S500, the system initiates a plurality of devices, each device belonging to one of a plurality of members of a group. In embodiments, and as described with respect to FIG. 4, the primary device (e.g., device 400-1) of devices 400-1, 400-2, 400-3 and 400-4 records identification information of the devices 400-1, 400-2, 400-3 and 400-4, the identification information including at least one of an identification of a defined group, an identity of each member of the group to which each device belongs, an identification of a primary device (e.g., device 400-1), a network address of each device, a purpose of the group, a purpose of each member within the group, a destination of the group, an age of each member, an interest of each member, a cost of each member, a lifetime of each member, and the like.

In embodiments, at step S510, the system monitors the proximities of each device within the same group of devices. In embodiments, the devices 400-1, 400-2, 400-3 and 400-4 communicate their respective proximity information to each other. In other embodiments, the devices 400-1, 400-2, 400-3 and 400-4 communicate their respective proximity information only to the primary device. In embodiments, the primary device (e.g., device 400-1) stores the proximity information of all the devices 400-1, 400-2, 400-3 and 400-4 in a memory thereof. In embodiments, the primary device (e.g., device 400-1) communicates the proximity information of all the devices 400-1, 400-2, 400-3 and 400-4 to a monitoring server via a network, such as the cloud computing environment 50 illustrated in FIG. 1. In embodiments, the proximity of each device 400-1, 400-2, 400-3 or 400-4 is updated at regular intervals, and the updated proximity information of each device 400-1, 400-2, 400-3 or 400-4 is stored in the memory of the primary device (e.g., device 400-1) at the regular intervals. In embodiments, the updated proximity information of each device 400-1, 400-2, 400-3 or 400-4 is transmitted to the monitoring server at the regular intervals. Alternatively, the proximity information of each device 400-1, 400-2, 400-3 or 400-4 is stored at other intervals. In embodiments, the proximity information of each device 400-1, 400-2, 400-3 or 400-4 is updated every 5 seconds (s), 15 s, 20 s, 30 s or 60 s. In embodiments, when the members of the group are packages, the proximity of each device 400-1, 400-2, 400-3 or 400-4 is updated every 0.5 hours (h), 1 h, 2 h, 5 h or 10 h.

In embodiments, a dynamic network consists of the devices 400-1, 400-2, 400-3 and 400-4 belonging to each member of a same group, the dynamic network being stored at the memory of the primary device (e.g., device 400-1). In embodiments, the dynamic network is stored at a memory of the monitoring server. In embodiments, the stored dynamic network provides a representation of the swarm of devices 400-1, 400-2, 400-3 and 400-4 at any defined time. In embodiments, the dynamic network is updated every time the proximity information of each of the devices 400-1, 400-2, 400-3 and 400-4 of the group is updated. Alternatively, the dynamic network is updated at other times.

In embodiments, at step S520, one of the devices 400-1, 400-2, 400-3 and 400-4, e.g., the primary device (e.g., device 400-1), establishes a maximum distance, the maximum distance being the largest distance that any device, and thus any member of the group that corresponds to the device, can be from any other device of the same group, and thus any other member of the group, at any point in time. In embodiments, the maximum distance is the largest distance that any device, and thus any member of the group that corresponds to the device, can be from the primary device (e.g., device 400-1). In embodiments, the maximum distance constitutes the effective largest size of the dynamic network constituted by the members of the group. In embodiments, a user of the device, or an administrator, determines the maximum distance.

In embodiments, at step S530, one of the devices 400-1, 400-2, 400-3 and 400-4, e.g., the primary device (e.g., device 400-1), determines whether any one of the devices 400-1, 400-2, 400-3 and 400-4, and thus any one of the members of the group, is at a distance that exceeds the maximum distance established at step S520. In response to none of the devices 400-1, 400-2, 400-3 and 400-4 being at a distance that exceeds the maximum distance established at step S520, one of the devices 400-1, 400-2, 400-3 and 400-4, e.g., the primary device (e.g., device 400-1), continues to monitor the dynamic network at step S510.

In embodiments, in response to any one of the devices 400-1, 400-2, 400-3 and 400-4 being at a distance that exceeds the maximum distance established at step S520, one of the devices 400-1, 400-2, 400-3 and 400-4, e.g., the primary device (e.g., device 400-1), sends an alert to the remaining devices 400-1, 400-2, 400-3 and 400-4 within the group at step S540. In embodiments, in response to any one of the devices 400-1, 400-2, 400-3 and 400-4 being at a distance that exceeds the maximum distance established at step S520, one of the devices 400-1, 400-2, 400-3 and 400-4, e.g., the primary device (e.g., device 400-1), sends an alert to the primary device (e.g., device 400-1) at step S540.

In embodiments, in response to any one of the devices of a first group, herein referred to as "separating device," being at a distance that exceeds the maximum distance established at step S520, one of the devices, e.g., the primary device, at step S550 determines whether the separating device is close to another group, herein referred to as "second group," the second group sharing a common context as the first group. In embodiments, the separating device is close to another group if the separating device is within the maximum distance established at step S520.

In embodiments, at step S560, in response to the separating device being close to the second group as determined at step S550, the separating device leaves the first group and becomes part of the second group. In embodiments, at step S560, in response to the separating device being close to the second group, the primary device of the first group updates the membership of the first group to remove the separating device from the membership of the first group, and the primary device of the second group updates the membership of the second group to add the separating device to the membership of the second group. In response to the separating device not being close to the second group, the separating device does not leave the first group and does not become part of the second group.

Figure 6:
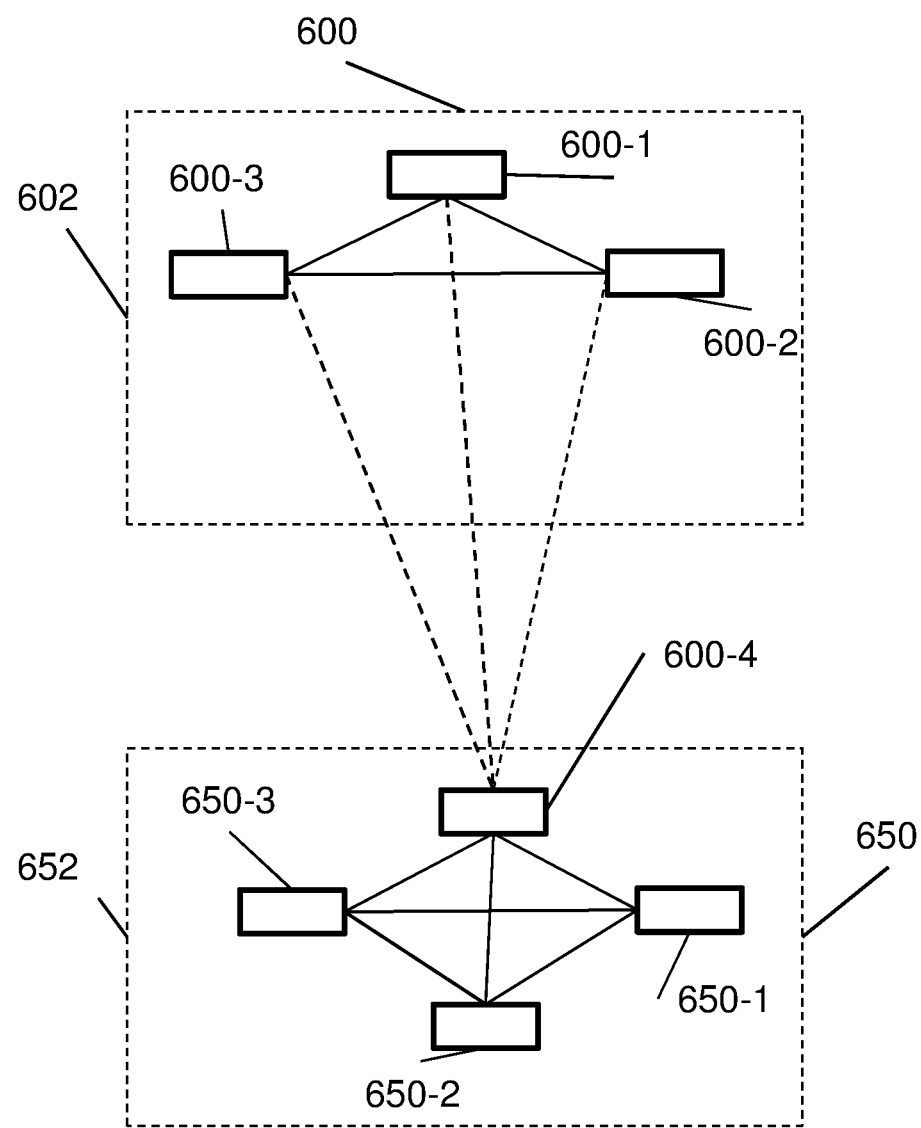
FIG. 6 shows a block diagram of an exemplary environment in accordance with aspects of the invention.

FIG. 6 shows a block diagram of an exemplary environment in accordance with aspects of the invention. In FIG. 6, a first group 600 of devices originally includes devices 600-1, 600-2, 600-3 and 600-4, each of the devices 600-1, 600-2, 600-3 and 600-4 being associated with a member of the group 600, and each member of the group 600 sharing a common context. In FIG. 6, a second group 650 of devices originally includes devices 650-1, 650-2 and 650-3, each of the devices 650-1, 650-2 and 650-3 being associated with a member of the group 650, and each member of the group 650 sharing the common context as each member of the group 600. In embodiments, the groups 600 and 650 each constitute an ad hoc network. In embodiments, the groups 600 and 650 each constitutes a piconet that includes an ad hoc network linking the wireless group of devices 600-1, 600-2, 600-3 and 600-4, and devices 650-1, 650-2 and 650-3, respectively, using, e.g., Bluetooth technology protocols. In embodiments, each of the plurality of devices 600-1, 600-2, 600-3, 600-4, 650-1, 650-2 and 650-3 includes one or more computer systems/servers such as the computer system/server 12 illustrated in FIG. 1. In embodiments, the devices 600-1, 600-2, 600-3, 600-4, 650-1, 650-2 and 650-3 are connected to each other without global positioning system (GPS) and without internet connectivity.

In embodiments, the device 600-1 of the first group 600 is a primary device, and devices 600-2, 600-3 and 600-4 are secondary devices. Accordingly, the devices 600-1, 600-2, 600-3 and 600-4 constitute a local scatternet. In embodiments, device 600-4 has drifted beyond the maximum distance at which any of the devices 600-1, 600-2, 600-3 and 600-4 can be from each other in order to remain a part of the first group 600. The maximum distance is illustrated by the dashed boundary 602. Accordingly, the device 600-4, and the member of the group associated with the device 600-4, are no longer part of the first group 600. In embodiments, the device 600-4 has drifted within the boundary of the second group 650, illustrated by the dashed boundary 652. Accordingly, the device 600-4, and the member of the group associated with the device 600-4, are now part of the second group 650.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    initiating, by a computer device, a plurality of devices, each device corresponding to a member of a group, the group including a plurality of members;
    monitoring, by the computer device, proximity information for each of the plurality of devices relative to at least one other one of the plurality of devices;
    establishing, by the computer device, a maximum distance for the devices to be spaced from each other;
    in response to one of the devices being separated from another of the devices by more than the maximum distance, sending an alert to at least one of remaining devices;
    determining, by the computer device, the one of the devices that is separated from the another of the devices is within a maximum distance of a second group which shares a common context with the group; and
    updating, by the computer device, a membership of the group by removing from the membership of the group the one of the devices in response to the second group adding the one of the devices to a membership of the second group.

2. The method of claim 1, wherein the initiating the plurality of devices comprises establishing identification information for each device and the corresponding member, and establishing the common context for all members of the group.

3. The method of claim 2, wherein the identification information comprises at least one selected from the group consisting of a network address, an identity of the corresponding member, a proximity information of the device, a purpose of the corresponding member, an age of the corresponding member, a cost of the corresponding member, a lifetime of the corresponding member, and a destination of the group.

4. The method of claim 2, wherein the common context comprises at least one selected from the group consisting of a purpose, an identity of each member of the plurality of members, an identification of a the primary device from the plurality of devices, a network address of each device, a purpose of the group, a purpose of each member of the group, a destination of the group, an age of each member, an interest of each member, a cost of each member, and a lifetime of each member.

5. The method of claim 2, wherein the plurality of members are packages, the common context includes the fact that the members of the group are packages, the numbers of packages, the estimated time of arrival of the packages, the common destination of the packages, and any intermediate way stations for the packages on a way to a common destination, and a proximity of each package is updated every 0.5 hours.

6. The method of claim 5, further comprising assigning a score to each member of the plurality of members to determine whether each member belongs to the group, wherein the sending the alert comprises utilizing information from the common context and metadata to produce a score to establish group similarity for matching and moving group members in groups.

7. The method of claim 1, wherein the monitoring the proximity information comprises transmitting the proximity information of each device to at least one other one of the plurality of devices within the group.

8. The method of claim 7, wherein the transmitting the proximity information comprises transmitting the proximity information of each device to the at least one other one of the plurality of devices via at least one selected from the group consisting of a Bluetooth device, a radio-frequency transmission device, and a low-power short range transmission device.

9. The method of claim 7, wherein the transmitting the proximity information comprises transmitting the proximity information at regular time intervals.

10. The method of claim 9, wherein the monitoring the proximity information comprises establishing a dynamic network encompassing the members of the group, the dynamic network being updated at the regular time intervals.

11. The method of claim 1, wherein the initiating the plurality of devices and the monitoring the proximity information are provided by a service provider on a subscription, advertising, and/or fee basis.

12. The method of claim 1, wherein the computer device includes software provided as a service in a cloud environment.

13. A computer program product, the computer program product comprising a computer readable storage medium having program instructions embodied therewith, the program instructions executable by a computing device to cause the computing device to:
   establish identification information for each of a plurality of devices, each device corresponding to a member of a group, the group including a plurality of members;
   establish a common context for the plurality of members of the group by identifying metadata associated with each device, the metadata including the common context of the group and a set of rules identifying the group, defined proximities of the group, and a defined number of members of the group;
   monitor proximity information for each of the plurality of devices relative to at least one other one of the plurality of devices;
   establish a maximum distance for the devices to be spaced from each other;
   in response to one of the devices being separated from another of the devices by more than the maximum distance, send an alert to at least one of remaining devices;
   determine the one of the devices that is separated from the another of the devices is within a maximum distance of a second group which shares a common context with the group; and
   update a membership of the group by removing from the membership of the group the one of the devices in response to the second group adding the one of the devices to a membership of the second group.

14. The computer program product of claim 13, wherein the identification information comprises at least one selected from the group consisting of a network address, an identity of the corresponding member, a proximity information of the device, a purpose of the corresponding member, an age of the corresponding member, a cost of the corresponding member, a lifetime of the corresponding member, and a destination of the group.

15. The computer program product of claim 13, wherein the program instructions causing the computing device to monitor the proximity information comprise program instructions causing the computing device to transmit the proximity information of each device to at least one other one of the plurality of devices within the group.

16. The computer program product of claim 13, wherein the program instructions causing the computing device to monitor the proximity information comprise program instructions causing the computing device to transmit the proximity information of each device to the at least one other one of the plurality of devices at regular time intervals via at least one selected from the group consisting of a Bluetooth device, a radio-frequency transmission device, and a low-power short range transmission device.

17. The computer program product of claim 16, wherein the program instructions causing the computing device to monitor the proximity information comprises program instructions causing the computing device to establish a dynamic network encompassing the members of the group, the dynamic network being updated at the regular time intervals.

18. A system comprising:
   a processor, a computer readable memory, and a computer readable storage medium;
   program instructions to establish identification information for each of a plurality of devices, each device corresponding to a member of a group, the group including a plurality of members;
   program instructions to establish a common context for the plurality of members of the group which includes a reason for members of the group being together and a set of rules which defines conditions for a member to be part of the group;
   program instructions to monitor a proximity information for each of the plurality of devices relative to at least one other one of the plurality of devices;
   program instructions to establish a maximum distance for the devices to be spaced from each other;
   program instructions to, in response to one of the devices being separated from another of the devices by more than the maximum distance, send an alert to at least one of remaining devices;
   program instructions to determine the one of the devices that is separated from the another of the devices is within a maximum distance of a second group which shares a common context with the group; and
   program instructions to update a membership of the group by removing from the membership of the group the one of the devices in response to the second group adding the one of the devices to a membership of the second group,
   wherein the program instructions are stored on the computer readable storage medium for execution by the processor via the computer readable memory.

19. The system of claim 18, wherein the identification information comprises at least one selected from the group consisting of a network address, an identity of the corresponding member, a proximity information of the device, a purpose of the corresponding member, an age of the corresponding member, a cost of the corresponding member, a lifetime of the corresponding member, and a destination of the group.

20. The system of claim 18, wherein the program instructions to monitor the proximity information comprise program instructions to transmit the proximity information of each device to the at least one other one of the plurality of devices at regular time intervals via at least one selected from the group consisting of a Bluetooth device, a radio-frequency transmission device, and a low-power short range transmission device.

* * * * *